Patented Oct. 21, 1941

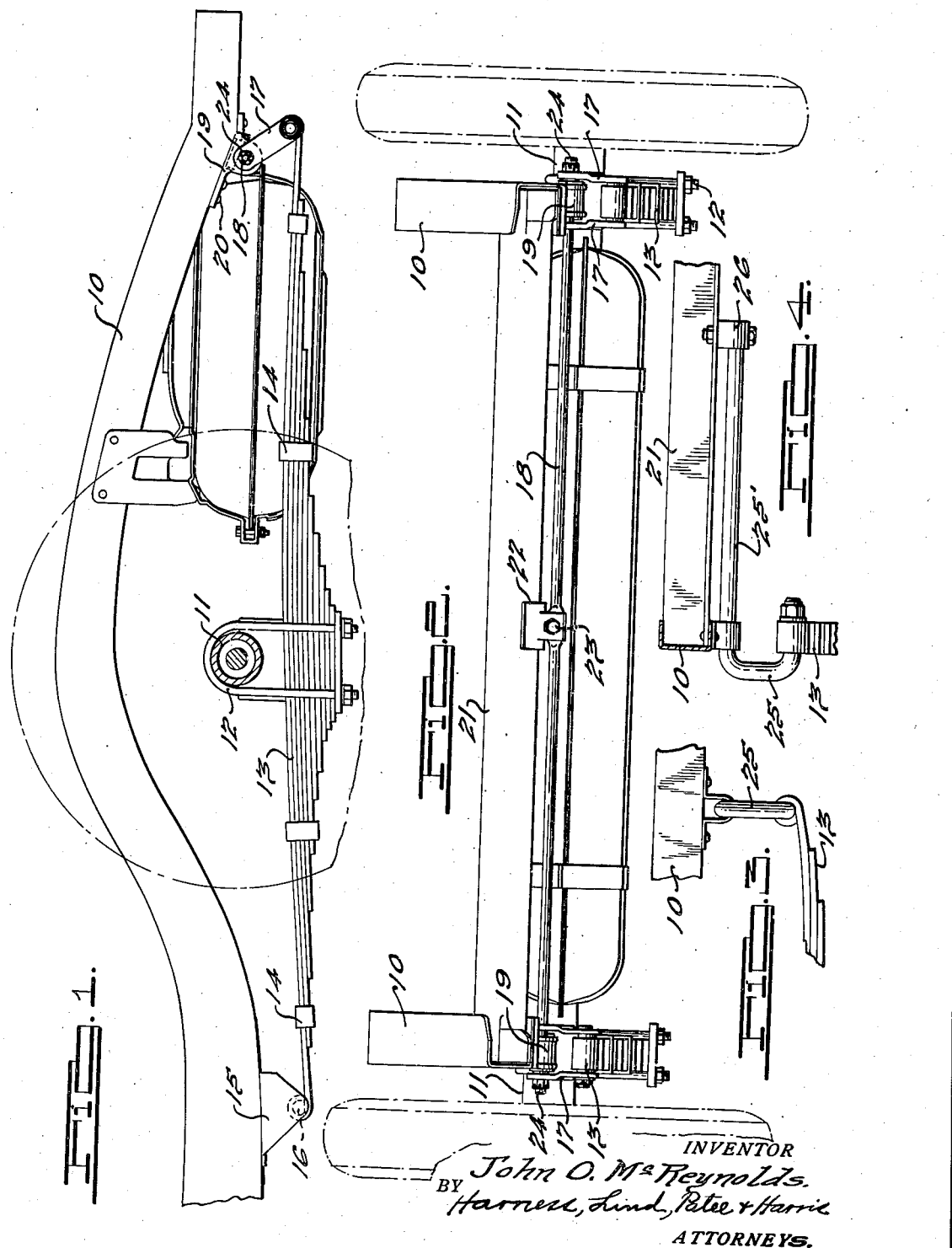

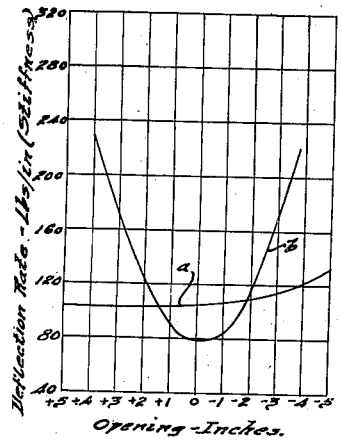
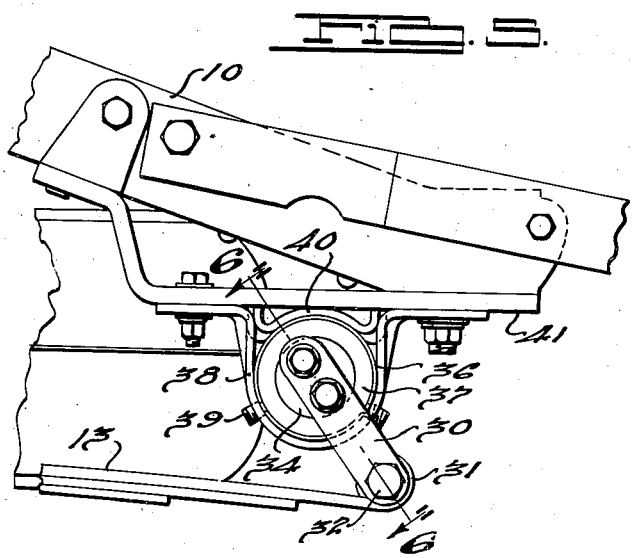
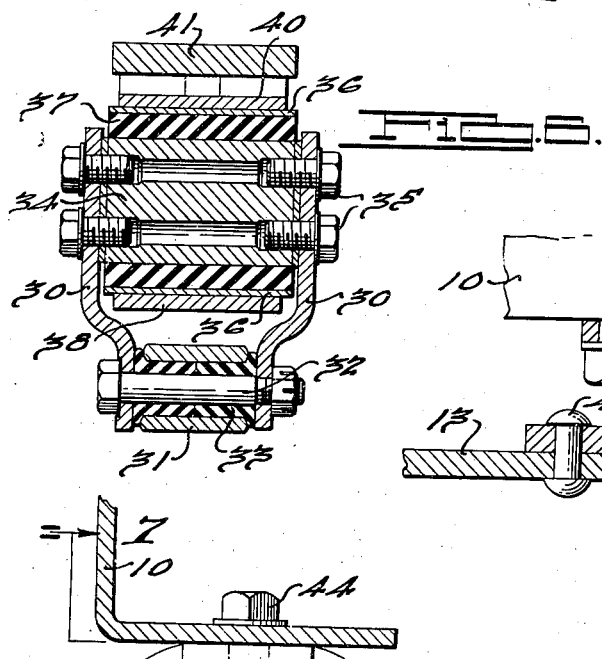
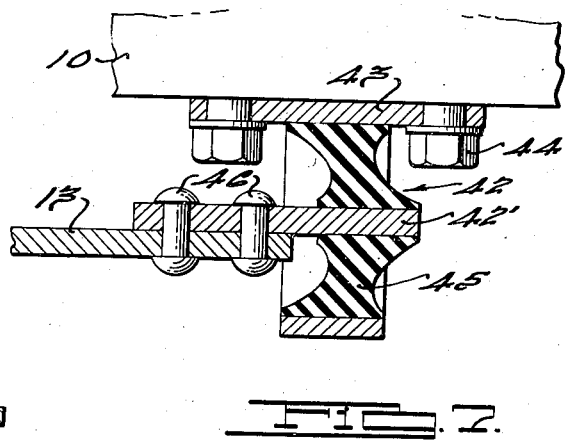
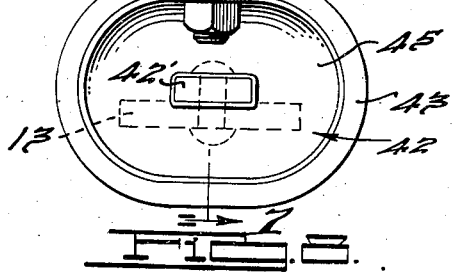
INVENTOR
John O. McReynolds
BY Harness, Dind, Pater & Harris
ATTORNEYS.

2,259,827

UNITED STATES PATENT OFFICE 2,259,827

CONTROL SHACKLE FOR LEAF SPRINGS

John O. McReynolds, Highland Park, Mich., assignor to Chrysler Corporation, Highland Park, Mich., a corporation of Delaware Application March 25, 1939, Serial No. 264,049

3 Claims. (Cl. 267—25)

This invention relates to motor vehicle spring suspensions of the type employing leaf springs.

It relates particularly to shackles for attaching such springs to the frame of a vehicle in such manner that the stiffness thereof may be automatically controlled.

During recent years there has been an increasing tendency toward the use of softer springs in vehicle suspensions. A steady improvement in the riding qualities of motor vehicles has been the result, but a point is rapidly being approached beyond which it will be impossible to go because of the tendency of the vehicle body to "bottom" or "strike through" when traversing rough roads.

It is an object of the present invention to provide a control device for leaf springs by means of which the stiffness of the spring may be automatically increased as the load is increased.

A further object of the invention is to provide a control device for a leaf spring by means of which the deflection rate of the spring may be automatically increased as the spring is deflected from its natural curvature.

A still further object is to provide a spring control means in the form of a shackle which will exert a force along a line between the eyes of the spring whereby the characteristics of the spring are altered as the spring is stressed.

A still further object is to provide, in a vehicle spring suspension, a reduction in spring deflection rate without a corresponding increase in spring stress.

Other objects will be apparent as the description progresses.

Reference is made to the accompanying drawings which illustrate a few of the many forms which my invention may assume.

Fig. 1 is a side elevation of the rearward end of a vehicle chassis embodying my invention.

Fig. 2 is a rear elevation of the chassis shown in Fig. 1.

Figs. 3 and 4 are respectively a side and rear elevation of a modified form of the invention.

Fig. 5 illustrates a further modification of the invention.

Fig. 6 is a sectional view taken along the line 6—6 of Fig. 5.

Fig. 7 is a sectional view along the line 7—7 of Fig. 8.

Fig. 8 illustrates a still further modification of the invention.

Fig. 9 is a chart showing by means of curves the performance characteristics of a spring shackled to the frame of a vehicle in accordance with the teaching of my invention and of the same spring shackled to the frame by means of a conventional shackle.

Referring now to Figs. 1 and 2, the numeral 10 designates the side sills of a vehicle chassis which are of the well-known inwardly presenting channel form. An axle 11 is suspended from the side sills at each side of the vehicle by means of a pair of leaf springs 13, the axle 11 being clamped to each of the springs by U-bolts 12 which also retain the leaves of the springs in assembled relation, assisted by the clips 14, as is well-known in the art.

The top leaf of each spring is provided with the usual eye at each end for attachment to the vehicle frame. At its forward end each spring is attached to a frame mounted bracket 15 by means of a pivot bolt 16. The rear eye of each spring is pivotally attached to a pair of swinging shackle plates 17 mounted on the frame for restricted swinging movement by means of a rod 18.

The rod 18 extends transversely across the rear end of the frame and is journalled at each side thereof in the brackets 19 which are attached to the frame side sills by suitable fastening means 20 as indicated in Fig. 1. A bracket 22 carried by the rear cross frame member 21 secures the rod 18 against rotation through the intermediary of a bolt 23.

The rod 18 has a reduced square end portion (not shown) at each end thereof which extends through a complementary square hole in each of the outer shackle plates 17 and a nut 24 threaded on each end of the rod firmly secures the outer plates 17 against movement relative thereto.

It will thus be seen that, as the axle 11 moves upwardly and downwardly with respect to the frame 10, swinging movement of the shackles 17 to accommodate the movement of the axle will impose a twist on the rod 18.

It is a well-known fact that the deflection rate (stiffness) of a leaf spring may be increased by imposing a force along the length of the spring tending to separate the eyes. The imposition of a compressive force, or one tending to move the eyes together along this length, will have the opposite effect.

In Fig. 1 the parts are shown under an average load condition corresponding to a vehicle load of four passengers. It will be noted that the spring has a slight negative camber or opening. In other words, the top leaf of the spring is curved slightly downwardly because of the load imposed at each end thereof. With a one passenger load in the vehicle, the spring shown in Fig. 1 would have a slight positive camber, or in other words, the curvature would be slightly upward. In the suspension illustrated in Figs. 1 and 2, the mechanism may be assembled in such manner that there is a compressive load imposed on the springs 13 when the vehicle is carrying a one passenger load. The amount of compressive load thus imposed may of course be varied by varying the amount of torsion in the bar 18 and is chosen to give the springs the desired characteristics.

Reference is now made to Fig. 9 which illustrates graphically how my control shackle may be made to change the characteristics of a typical spring. The curves show the variation in stiffness of (a) a spring of the type generally used in the rear suspension of a 5-passenger sedan, and (b) the same spring when shackled to the frame by my improved shackle, as the spring is flexed.

Along the vertical axis the deflection rate or stiffness in pounds per inch has been plotted, and along the horizontal axis, the amount of spring opening in inches has been plotted. The zero opening position of a leaf spring is the position assumed by the spring when the center of the top leaf is on a line drawn between the centers of the eyes. The spring 13 in Fig. 1 has on opening of approximately minus two inches as shown therein.

As shown by the curve designated a on Fig. 9, the spring 13 has a natural deflection rate of approximately 105 in. lbs. when attached to the frame in the conventional manner. As the negative opening is increased (due to an increase in static load or a bump in the road which causes the axle to move upwardly toward the frame) the curve a rises gradually to a maximum of about 130 in. lbs. at minus five inches opening. The slight upward trend of the curve is due to the action of the shackle which, even when mounted for free swinging, will exert some tension in the spring under extreme load conditions due to the fact that the shackle is ordinarily set at an angle of approximately 65° with respect to the line joining the spring eyes.

The curve designated b on Fig. 9 shows the action of the spring 13 when shackled to the frame by my control shackle under such conditions that a slight amount of compressive load is imposed in the spring throughout the range of operation when the vehicle is traveling over a reasonably smooth road. As shown by curve b, the deflection rate of the spring is actually decreased during the time that the spring is operating in the deflection range between minus two inches and plus one and one-half inches opening. This results in a softer ride which of course increases the comfort of the passengers.

It will also be noted that the deflection rate of the spring rapidly increases with an increase in opening beyond that corresponding to the normal operating range of the spring. In other words, abnormal deflection of the spring resulting from extreme upward movement of the axle (negative opening) or extreme downward movement of the axle (positive opening) causes a rapid stiffening of the spring due to the tension control placed thereon by the shackle.

It will thus be seen that I have provided a means for altering the characteristics of a leaf spring in such manner that the spring may be made to give a softer boulevard ride than it would normally give and yet offer a sharp and progressive resistance to "bottoming" or "striking through" when the vehicle is traversing rough roads.

By changing the amount of control load imposed by the shackle 17, the spring 13 may be made to conform to almost any desired characteristics. The curves of Fig. 9 represent a typical setup for a five-passenger vehicle of medium size.

A further and important advantage resulting from the use of my improved control shackle resides in the fact that it offers a practical means for securing a reduction in spring rate without correspondingly increasing the spring stress. Formerly, if a softer ride was desired, a spring having a lower natural deflection rate was employed which meant, of course, that the spring stress was increased due to the greater deflection permitted under load conditions. With my novel control shackle, a reduction in the effective spring rate may be obtained without altering or changing in any way the physical characteristics of the spring per se.

Figs. 3 and 4 illustrate a modification of the arrangement just described. In this form of the invention, the rod 18 and shackle members 17 are replaced by a pair of one-piece control shackles, one of which is indicated at 25. A separate shackle 25 is provided for each spring, each shackle having an elongated control portion 25' which extends horizontally across the rear of the frame and is adapted to be anchored against rotation by a bracket 26 carried by the rear frame cross member 21. Up and down movement of the axle causes the distance between the spring eyes to change which in turn causes swinging of the shackle 25. This swinging is controlled by the portion 25', the diameter and length of which may be chosen to impart the correct characteristics to the spring. If desired, a continuous rod, similar to the rod 18 of Figs. 1 and 2, may be used, in which case a U-shaped portion for mounting the spring would be formed directly on each end thereof.

In the modification illustrated in Figs. 5 and 6, the shackle plates 30 are pivoted to the rear eye 31 of the spring 13 by the bolt 32, a rubber bushing 33 being disposed therebetween to insure quietness. The upper ends of the plates 30 are respectively secured to the opposite ends of a metal bushing 34 by the tap screws 35. Bushing 34 is surrounded by a second bushing 36 and the hollow annular space between said bushings is completely filled with rubber as indicated at 37. The rubber is bonded to the exterior surface of the bushing 34 and to the interior surface of the bushing 36 thereby forming a torsionally resilient connection between these members.

The bushing 36 is securely fastened to the chassis side frame member 10 through the intermediary of the bracket 41 and the clamp members 38 and 40 as is apparent from Fig. 5. A pair of set screws 39 are threaded through the clamp member 38 and may be tightened against the bushing 36 to prevent circumferential displacement thereof relative to the clamp.

The operation of this modification is the same as described above except that the control force is imposed on the spring by means of a rubber torsion member instead of a metal one.

In the modification illustrated in Figs. 7 and 8, the spring 13 is shackled to the frame member 10 by means of the shackle 42 which consists of a flat spring attaching member 42' resiliently mounted in an oblong continuous member 43 by means of rubber 45 which is bonded to both members. The member 43 is adapted to be attached to the chassis frame member 10 by bolts 44 and the member 42' is adapted to be attached to the top leaf of a spring 13 by the rivets 46. Any other suitable type of fastening means may be used, or the end of the top leaf of the spring may be bonded directly to the rubber member 45 in place of the member 42' if desired. The modification just described is particularly adapted for use in installations where low cost is an important factor.

Having thus described my invention, that which I claim is new and desire to secure by Letters Patent is set forth in the following claims.

I claim:

1. The combination with a vehicle having a leaf spring and a part to which the spring is connected, of a shackle for connecting one end of said spring to said part and for imposing a control load along the length of said spring comprising an elongated rod non-rotatably fixed to the vehicle at one end thereof, said rod having a downwardly extending reversely bent portion at its opposite end for pivotally supporting one end of said spring.

2. The combination with a vehicle having a leaf spring and a part to which the spring is connected, of a shackle structure for connecting one end of said spring to said part and for imposing a control load along the length of said spring comprising an elongated torsion rod carried by said vehicle and non-rotatably fixed relatively thereto, said rod having a downwardly extending reversely bent portion adjacent an end thereof for pivotally supporting one end of said spring.

3. The combination with a vehicle having a leaf spring and a part to which the spring is connected, of a shackle structure for connecting one end of said spring to said part and for imposing a control load along the length of said spring comprising an elongated torsion rod carried by said vehicle and non-rotatably fixed relatively thereto, said rod having a downwardly extending reversely bent portion adjacent an end thereof for pivotally supporting one end of said spring, said rod being mounted on said vehicle with an initial deformation whereby a control load is imposed along the length of said spring tending to reduce the inherent rate thereof in the normal load position.

JOHN O. McREYNOLDS.